Dec. 2, 1958    J. L. BLOOMER ET AL    2,862,307
PROCESSING CHAMBER
Filed Aug. 7, 1957

INVENTORS
JAMES L. BLOOMER.
CHARLES W. KEENAN.
BY Cameron, Kerkam & Sutton
ATTORNEYS

# United States Patent Office 2,862,307
Patented Dec. 2, 1958

2,862,307

PROCESSING CHAMBER

James L. Bloomer and Charles W. Keenan, Knoxville, Tenn., assignors to The University of Tennessee Research Corporation, Knoxville, Tenn., a corporation of Tennessee Application August 7, 1957, Serial No. 676,865

8 Claims. (Cl. 34—92)

This invention relates to an improved processing chamber or "dry box" for maintaining a desired vacuum or inert atmosphere during the manipulation or handling of various chemical materials, particularly pyrophoric materials or other materials of the chemically active type which react with air.

The apparatus of the present invention is preferably formed of heavy Pyrex glass or analogous material, is of T-shaped construction, as shown, and of circular cross-section. It is supported at its extremities in three U-shaped, slotted cradles. Three slidable lids are provided at the extremities of the T-shaped chamber, removably supported thereagainst in said cradles, the outer surfaces of their peripheral flanges being ground and planar to provide a perfect seal at the chamber extremities when a vacuum is being drawn on the chamber or when it is being filled with an inert gas.

As shown, two of the adjoining extremities of the apparatus are provided with sealed in, inwardly extending rubber arm and glove members to receive the arms and hands of the operator manipulating the material within the chamber. The third extremity is provided for the introduction of the material to be treated or handled.

Appropriate stopcocks are provided adjacent one extremity of the chamber whereby it may be evacuated and through which inert gas may be introduced into the chamber after evacuation.

Novel valve means are provided, extending through a wall of the rubber arm and glove members to allow passage of gas therethrough to equalize pressure on both sides of the arm and glove members and prevent rupturing thereof during evacuation of the chamber or its filling with an inert gas.

As the chamber is formed in cylindrical shape and is fabricated from heavy Pyrex glass it will withstand atmospheric pressure (approximately 4.7 tons) when the gases are evacuated therefrom. Due to the novel construction of the chamber, air or other gaseous substances may be evacuated or flushed out very quickly, in approximately one half hour, using a good vacuum pump, which is of particular importance to the scientist who must handle sensitive materials in an inert atmosphere. Further, due to its all glass construction, the chamber is chemically resistant and easily cleaned, visibility is complete and the cost of farbrication is reduced to a fraction of normal cost.

It is therefore a primary object of this invention to evolve a novel manipulating chamber wherein the atmosphere may be readily controlled and which may be evacuated in a short period of time and may be readily filled with an inert gas to a pressure equal to or slightly above atmospheric pressure.

It is a further object of this invention to provide such an apparatus with rubber manipulating arms and gloves, provided with novel valve members, which will not be ruptured by the evacuation or filling of the chamber.

It is another object of this invention to evolve such a structure which is economical to manufacture and of considerable simplicity to operate and one which will enable the operator to regulate the atmosphere within as desired.

It is a further object of this invention to evolve novel valve means for such an apparatus whereby the atmosphere therewithin may be controlled as desired.

Another object is to provide novel support means for the extremities of the chamber and for its lids.

Other and further objects of this invention will become apparent as this specification proceeds.

Figure 1:
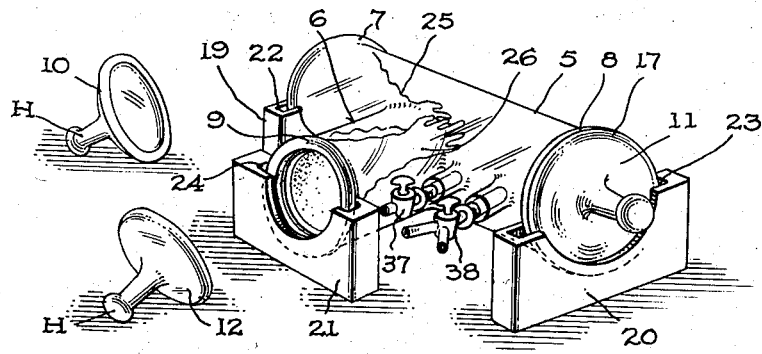
Fig. 1 is a perspective view of the apparatus with the manipulative lids removed.
Figure 2:
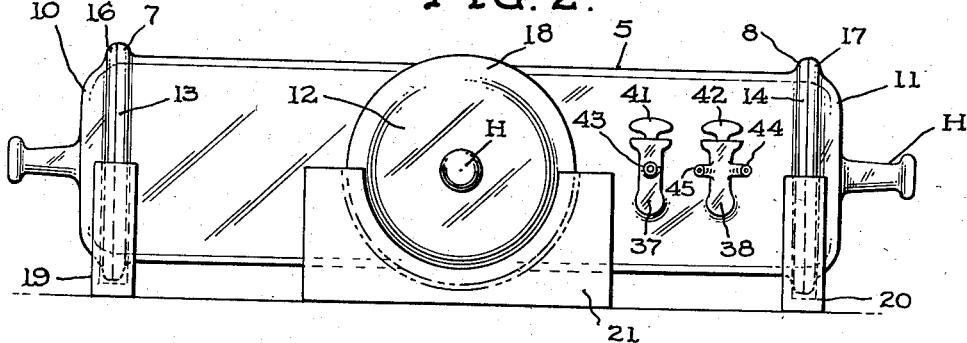
Fig. 2 is a side view thereof with the lids in closed condition.
Figure 3:
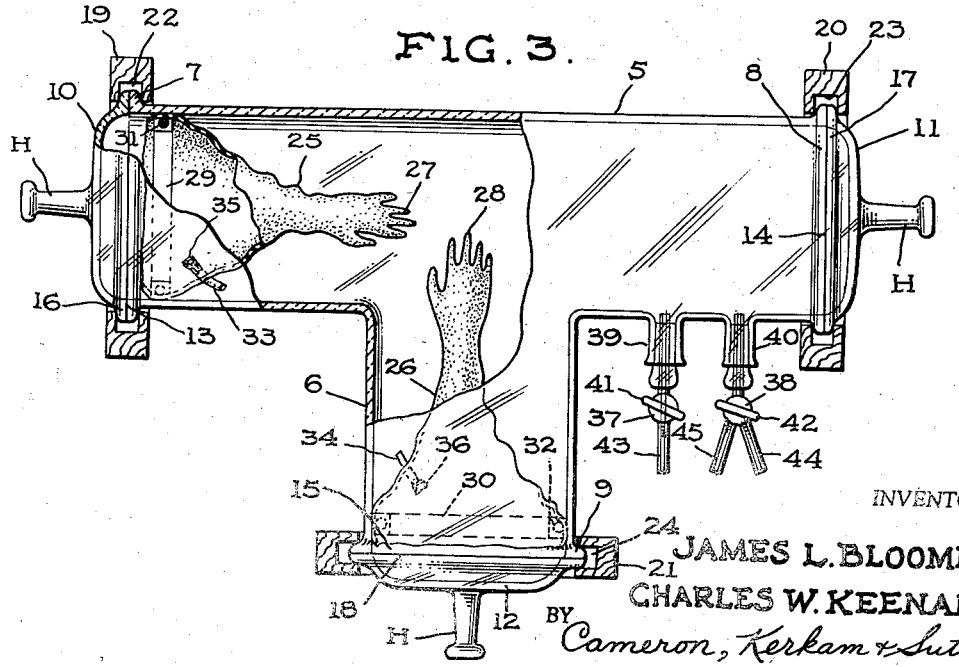
Fig. 3 is a top plan view, partially broken away, showing the rubber arm-glove members in position within the chamber and with all lids in place.

Referring to the drawing, 5 indicates the body of the apparatus which is preferably cylindrical in shape and formed of heavy Pyrex glass capable of withstanding superatmospheric pressures when substantially completely evacuated. Intersecting and communicating with main body 5 of the chamber is cylindrical arm 6 disposed at right angles thereto and centrally thereof. Cylindrical arm 6 is also preferably formed of heavy Pyrex glass and is of the same diameter as chamber 5 and of approximately one third its length. As the cylindrical apparatus is T-shaped it will be seen that access to the interior thereof may be gained through all three of its circular and flanged extremities 7, 8 and 9 when desiccator lids 10, 11 and 12 are removed from sealing contact therewith. The circular peripheral flanges 13, 14 and 15 of extremities 7, 8 and 9 of the chamber are preferably planar on their outer surfaces and are ground on these surfaces. They are preferably rounded on their opposed, inner surfaces and thus taper slightly to their outer edges.

Lids 10, 11 and 12 are preferably circular and belled and are of the same diameter as chamber extremities 7, 8 and 9 at their outer, flanged peripheries. They are provided with flanges 16, 17 and 18 about their outer peripheries, which are of the same diameter and width as flanges 13, 14 and 15 of extremities 7, 8 and 9 of the chamber. Lid flanges 16, 17 and 18 are planar on their outer surfaces and are ground to register exactly with the outer, planar and ground surfaces of flanges 13, 14 and 15 of chamber extremities 7, 8 and 9. Flanges 16, 17 and 18 are rounded on their inner surfaces. Thus, when the corresponding ground planar surfaces of flanges 13, 14 and 15 of the chamber extremities and flanges 16, 17 and 18 of lids 10, 11 and 12 are greased and held in close bearing contact with each other an airtight seal is effected between them.

Lids 10, 11 and 12 are preferably formed of heavy Pyrex glass and are provided with rectangularly disposed, central handle members H, for manipulation.

The apparatus is supported at its extremities and the ground planar surfaces of the flanges of the desiccator lids are held in close, airtight relationship against the corresponding planar surfaces of the flanges of chamber extremities 7, 8 and 9 of the apparatus by means of suitable support cradles or brackets 19, 20 and 21, provided at the three extremities of the chamber. Support cradles 19, 20 and 21 are preferably of rectangular outer configuration and are cut away semi-circularly at their centers to conform to the curvature of the extremities of the chamber. They preferably extend upwardly about the chamber extremities to one half the height thereof and are formed of wood or analogous material. The semi-circular recesses in the upper extremities of cradles 19, 20 and 21 are preferably vertically and semicircularly slotted at 22, 23 and 24 to a depth slightly greater than the height of the flanges of the chamber extremities and lids. Slots 22, 23 and 24 are preferably of a width slightly less than the combined base widths of the lid and extremity flanges. As the edges of slots 22, 23 and 24 are rectilinear and the inner shoulders of flanges 13, 14, 15 and 16, 17, 18 are curved and outwardly tapered, a wedging action is exerted when the lid flanges are inserted downwardly into slots 22, 23, 24 forcing the ground faces of the flanges into close, sealing contact and maintaining them in such contact.

If desired, support cradles 19, 20 and 21 may be permanently affixed to the flanged extremities of the chamber.

Flanged extremity 8 of the chamber and its lid 11 are provided as an access port through which material may be inserted into the chamber for manipulation.

Within extremities 7 and 9 of the chamber are sealed rubber arm-glove members 25 and 26 which are preferably formed of flexible rubber sheeting carrying at their inner extremities glove members 27 and 28 for the hands of the operator. At their outer peripheral extremities arm-glove members 25 and 26 are sealed against the inner peripheral walls of extremities 7 and 9 of the chamber, adjacent their flanges, by means of rings 29 and 30 provided with sealing tubing 31 and 32 about their outer peripheries. The sealing of the outer extremities of arm-glove members 25 and 26 is completed by cementing their peripheral edges beneath rings 29 and 30 and sealing tubes 31 and 32 to the inner peripheral walls of extremities 7 and 9 of the chamber with rubber cement. It will thus be seen that the outer extremities of arm-glove members 25 and 26 are sealed in airtight condition against the inner peripheral walls of extremities 7 and 9 of the chamber.

Arm-glove members 25 and 26 are provided adjacent their outer extremities with small tube valves 33 and 34 which are sealed therethrough and which are provided at their outer ends with removable glass seal plugs 35 and 36 by means of which tube valves 33 and 34 may be opened or closed, as desired.

Stopcocks 37 and 38 are provided in body 5 of the chamber, adjacent extremity 8 thereof and, as shown, are sealed thereinto through nipples 39 and 40 formed in the outer periphery of the body of the chamber. Valve members 41 and 42 are provided to open and close stopcocks 37 and 38. As shown, a single pipe or tubing 43 preferably extends outwardly from stopcock 37, while two tubing outlets 44 and 45 extend outwardly from stopcock 38. Tubing outlets 44 and 45 may be respectively connected to a vacuum pump and to a source of inert gas, as desired, in the operation of the chamber. Thus, the chamber may be evacuated through stopcock 38 by means of pipe 44 connected to an appropriate vacuum pump and may then be filled with argon or other inert gas through pipe 45 thereof, after the desired degree of evacuation of the chamber has been attained. Stopcock 37 may be used as an evacuating valve for the chamber or for introducing gas thereinto.

In one form of operation the pyrophoric material or other material to be manipulated or handled in the inert atmosphere within the chamber is first inserted into the chamber by removing lid 11, placing the object within the chamber and replacing lid 11. Lids 10 and 12 are then removed and the glass seal plugs 35 and 36 of arm-glove valve tubes 33 and 34 are removed therefrom. Lids 10 and 12 are then replaced in support frames 19 and 21. The chamber is thus sealed. The chamber is then evacuated through stopcock 38 and is then filled with argon, or any other desired gas. This operation is repeated twice, the chamber finally being filled to a pressure of an inch or more of mercury in excess of atmospheric pressure. With a suitable pressurized inert atmosphere in the chamber, lids 10 and 12 are removed, plugs 35 and 36 being inserted into valve tubes 33 and 34 while gas still flows out of tubes 33 and 34. The chamber is thus completely sealed with a pressurized inert atmosphere therewithin and is ready for use, completely filled with inert gas.

A typical operation which may be carried out within the chamber is the transfer of a pyrophoric material from its container to a sample bulb. Thus, small samples of chemically active materials which would react with air are conveniently transferred from one container to another in the atmosphere of inert gas within the chamber.

While the box is in use argon or other inert gas may flow through it continually and may be delivered to any point or taken out at any point via tubes attached to the arms of stopcocks 37 and 38 within the chamber.

The apparatus is preferably formed from 6 inch I. D. Pyrex glass pipe, but may be formed from any analogous material, as desired.

The novel dry box or chamber may be utilized wherever it is desired to draw a high degree of vacuum or to manipulate a pyrophoric material in an inert atmosphere. It is susceptible of many other laboratory uses, as will be apparent to those skilled in the art.

The dimensions of the chamber may be varied as desired and the method of affixing the lids to the extremities thereof may be varied at will, without departing from the spirit of the invention.

Any suitable type of valve may be substituted for the arm-glove valves. The valves may be in the gloves, as shown, or may be provided in auxiliary tubing affixed outside of the gloves within the chamber and communicating through the gloves to connect or separate the atmospheres on both sides of the gloves.

This specification is by way of illustration of one embodiment of the invention only. Attention is directed to the appended claims for a limitation of the scope of the invention.

What is claimed is:

1. In an evacuation chamber, a cylindrical body section, an auxiliary section of cylindrical shape rectangularly disposed centrally of said body section and opening thereinto, slidable lids hermetically sealing the extremities of said body section and said auxiliary section, bracket means supporting the extremities of said body section and said auxiliary section and sealing said lids against the extremities thereof, rubber arm-gloves sealed into one extremity of said body section and into said auxiliary section extending into the interior thereof, valves in said body section permitting the evacuation of said chamber and its filling with gas whereby an operator may manipulate a pyrophoric material in said chamber in an atmosphere of inert gas.

2. In an evacuation chamber, a cylindrical body section, an auxiliary section of cylindrical shape rectangularly disposed centrally of said body section and opening thereinto, circular lids hermetically sealing the extremities of said body section and said auxiliary section, slotted bracket means supporting the extremities of said body section and said auxiliary section and sealing said lids against the extremities thereof, rubber arm-gloves sealed into one extremity of said body section and into said auxiliary section extending into the interior thereof, tube valves in said arm-gloves, stoppers for said tube valves fitted in the extremities thereof, valves in said body section permitting the evacuation of said chamber and its filling with gas whereby an operator may manipulate a pyrophoric material in said chamber in an atmosphere of inert gas.

3. In an evacuation chamber, a heavy glass cylindrical body section, a short heavy glass section of cylindrical shape rectangularly disposed centrally of said body section and opening thereinto, flanged lids hermetically sealing the extremities of said body section and said auxiliary section, semi-circular, slotted bracket means supporting the extremities of said body section and said auxiliary section and sealing said lid flanges against the extremities thereof, rubber arm-gloves sealed into one extremity of said body section and into said auxiliary section extending into the interior thereof, valves in said arm-gloves, valves in said body section permitting the evacuation of said chamber and its filling with gas whereby an operator may manipulate a pyrophoric material in said chamber in an atmosphere of inert gas.

4. In an evacuation chamber, a cylindrical body section formed of Pyrex glass, an auxiliary Pyrex glass section of cylindrical shape rectangularly disposed centrally of said body section and opening thereinto, domed lids hermetically sealing the extremities of said body section and said auxiliary section, handles on said lids, deeply slotted bracket means fitted about and supporting the extremities of said body section and said auxiliary section and sealing said lids against the extremities thereof, rubber arm-gloves sealed into one extremity of said body section and into said auxiliary section extending into the interior thereof, tube valves in said arm-gloves, closure means for said tube valves, valves in said body section permitting the evacuation of said chamber and its filling with gas whereby an operator may manipulate a pyrophoric material in said chamber in an atmosphere of inert gas.

5. In an evacuation chamber, a cylindrical body section, a shortened auxiliary section of cylindrical shape rectangularly disposed centrally of said body section and opening thereinto, flanged lids hermetically sealing the extremities of said body section and said auxiliary section, bracket means supporting the extremities of said body section and said auxiliary section and sealing said lids against the extremities thereof, rubber arm-gloves sealed into one extremity of said body section and into said auxiliary section extending into the interior thereof, valves in said arm-gloves, petcocks in said body section permitting the evacuation of said chamber and its filling with gas whereby an operator may manipulate a pyrophoric material in said chamber in an atmosphere of inert gas.

6. In an evacuation chamber, a cylindrical body section, an auxiliary section of cylindrical shape rectangularly disposed centrally of said body section and opening thereinto, circular flanged lids provided with ground rectilinear bearing surfaces hermetically sealing the extremities of said body section and said auxiliary section, bracket means supporting the extremities of said body section and said auxiliary section and sealing said lid flanges against the extremities thereof, rubber arm-gloves sealed into one extremity of said body section and into said auxiliary section extending into the interior thereof, valves in said arm-gloves, valves in said body section permitting the evacuation of said chamber and its filling with gas whereby an operator may manipulate a pyrophoric material in said chamber in an atmosphere of inert gas.

7. In an evacuation chamber, a cylindrical body section, an auxiliary section of cylindrical shape rectangularly disposed centrally of said body section and opening thereinto, lids hermetically sealing the extremities of said body section and said auxiliary section, rubber arm-gloves sealed into one extremity of said body section and into said auxiliary section extending into the interior thereof, tube valves in said arm-gloves, stoppers for said tube valves, cradles supporting the extremities of the chamber, semicircular, deeply slotted recesses in said cradles receiving said lids, valves in said body section permitting the evacuation of said chamber and its filling with gas whereby an operator may manipulate a pyrophoric material in said chamber in an atmosphere of inert gas.

8. In an evacuation chamber, a cylindrical body section, an auxiliary section of cylindrical shape rectangularly disposed centrally of said body section and opening thereinto, circular lids hermetically sealing the extremities of said body section and said auxiliary section, planar flanges about the outer peripheries of said lids, rubber arm-gloves sealed into one extremity of said body section and into said auxiliary section extending into the interior thereof, valves in said arm-gloves, means for opening and closing said valves, deeply slotted cradles supporting the extremities of said chamber and maintaining said lids closely thereagainst, valves in said body section permitting the evacuation of said chamber and its filling with gas whereby an operator may manipulate a pyrophoric material in said chamber in an atmosphere of inert gas.

References Cited in the file of this patent

UNITED STATES PATENTS

| 1,642,577 | Carson | Sept. 13, 1927 |
| 2,473,033 | Letac | June 14, 1949 |
| 2,598,532 | Gibbon | May 27, 1952 |

FOREIGN PATENTS

| 16,362 | Great Britain | 1890 |
| 772,020 | France | Oct. 22, 1934 |